(12) United States Patent
Gudlavenkatasiva et al.

(10) Patent No.: US 8,862,937 B2
(45) Date of Patent: Oct. 14, 2014

(54) METHOD AND SYSTEM FOR MIGRATING DATA FROM MULTIPLE SOURCES

(75) Inventors: Bhaskar R. Gudlavenkatasiva, Tampa, FL (US); Vinodh Prabhu, Tampa, FL (US); Sunil Kumar, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 359 days.

(21) Appl. No.: 12/775,222

(22) Filed: May 6, 2010

(65) Prior Publication Data

US 2011/0276821 A1    Nov. 10, 2011

(51) Int. Cl.
*G06F 11/00* (2006.01)
*G06F 11/07* (2006.01)

(52) U.S. Cl.
CPC .................. *G06F 11/0751* (2013.01)
USPC .............. 714/20; 711/162; 711/165

(58) Field of Classification Search
USPC ........................................... 714/20
See application file for complete search history.

(56) References Cited

U.S. PATENT DOCUMENTS

| | | | |
|---|---|---|---|
| 5,146,460 A * | 9/1992 | Ackerman et al. | 714/33 |
| 6,134,580 A * | 10/2000 | Tahara et al. | 709/202 |
| 6,233,608 B1 * | 5/2001 | Laursen et al. | 709/217 |
| 6,509,908 B1 * | 1/2003 | Croy et al. | 715/716 |
| 6,564,336 B1 * | 5/2003 | Majkowski | 714/4.1 |
| 7,080,221 B1 * | 7/2006 | Todd et al. | 711/161 |
| 7,080,225 B1 * | 7/2006 | Todd | 711/165 |
| 7,093,088 B1 * | 8/2006 | Todd et al. | 711/162 |
| 7,353,432 B1 * | 4/2008 | Talagala et al. | 714/52 |
| 7,506,101 B2 * | 3/2009 | Liu et al. | 711/114 |
| 7,770,053 B1 * | 8/2010 | Bappe et al. | 714/3 |
| 7,805,583 B1 * | 9/2010 | Todd et al. | 711/162 |
| 7,870,169 B2 * | 1/2011 | Draper et al. | 707/812 |
| 7,921,330 B2 * | 4/2011 | Riemers | 714/20 |
| 8,392,753 B1 * | 3/2013 | Don et al. | 714/6.3 |
| 2005/0198450 A1 * | 9/2005 | Corrado et al. | 711/162 |
| 2006/0129771 A1 * | 6/2006 | Dasgupta et al. | 711/162 |
| 2006/0190487 A1 * | 8/2006 | Hicks et al. | 707/104.1 |
| 2006/0212671 A1 * | 9/2006 | Todd | 711/165 |
| 2006/0236055 A1 * | 10/2006 | Iitsuka | 711/165 |
| 2007/0130423 A1 * | 6/2007 | Liu et al. | 711/114 |
| 2007/0174542 A1 * | 7/2007 | Okada et al. | 711/100 |
| 2009/0006493 A1 * | 1/2009 | Draper et al. | 707/202 |
| 2009/0222691 A1 * | 9/2009 | Riemers | 714/18 |

* cited by examiner

*Primary Examiner* — Kamini Patel

(57) ABSTRACT

An approach is provided for migrating data. Data is received from a plurality of source systems. The received data is processed for conversion to a target system. A failure condition associated with the processing is detected. An action is selectively initiated from a point of failure corresponding to the detected failure condition. The action includes either retrying the processing, aborting the processing, initiating simulation of the process, forcing completion of the processing, or a combination thereof.

20 Claims, 13 Drawing Sheets

METHOD AND SYSTEM FOR MIGRATING DATA FROM MULTIPLE SOURCES

BACKGROUND INFORMATION

Computing and communication systems are continually being improved and upgraded with newer hardware and software to meet the growing information processing and communication demands. It is most often the case that data contained within legacy systems need to be transferred, or in other terms, migrated onto newer ones to be able to utilize advances in technology. Service providers, e.g., telecommunications service providers, engage in the handling of voluminous data in the conduct of normal business services and functions. For example, the proliferation of Internet applications and services, such as Voice over Internet Protocol (VoIP), and the popularity of cellular communication systems have resulted in the continual processing of telephone numbers on a large scale. To improve data accuracy and reduce duplication, significant efforts have been made to migrate data from one platform to a different platform. It is typically tedious and unwieldy to perform migration of data, especially from a combination of multiple legacy and newer sources that may be strongly decoupled and disparate from each other.

Therefore, there is a need for an approach that enables efficient migration of data, particularly from multiple sources.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing data migration are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to migrating data relating to telecommunication services, it is contemplated that various exemplary embodiments are also applicable to other services.

Figure 1:
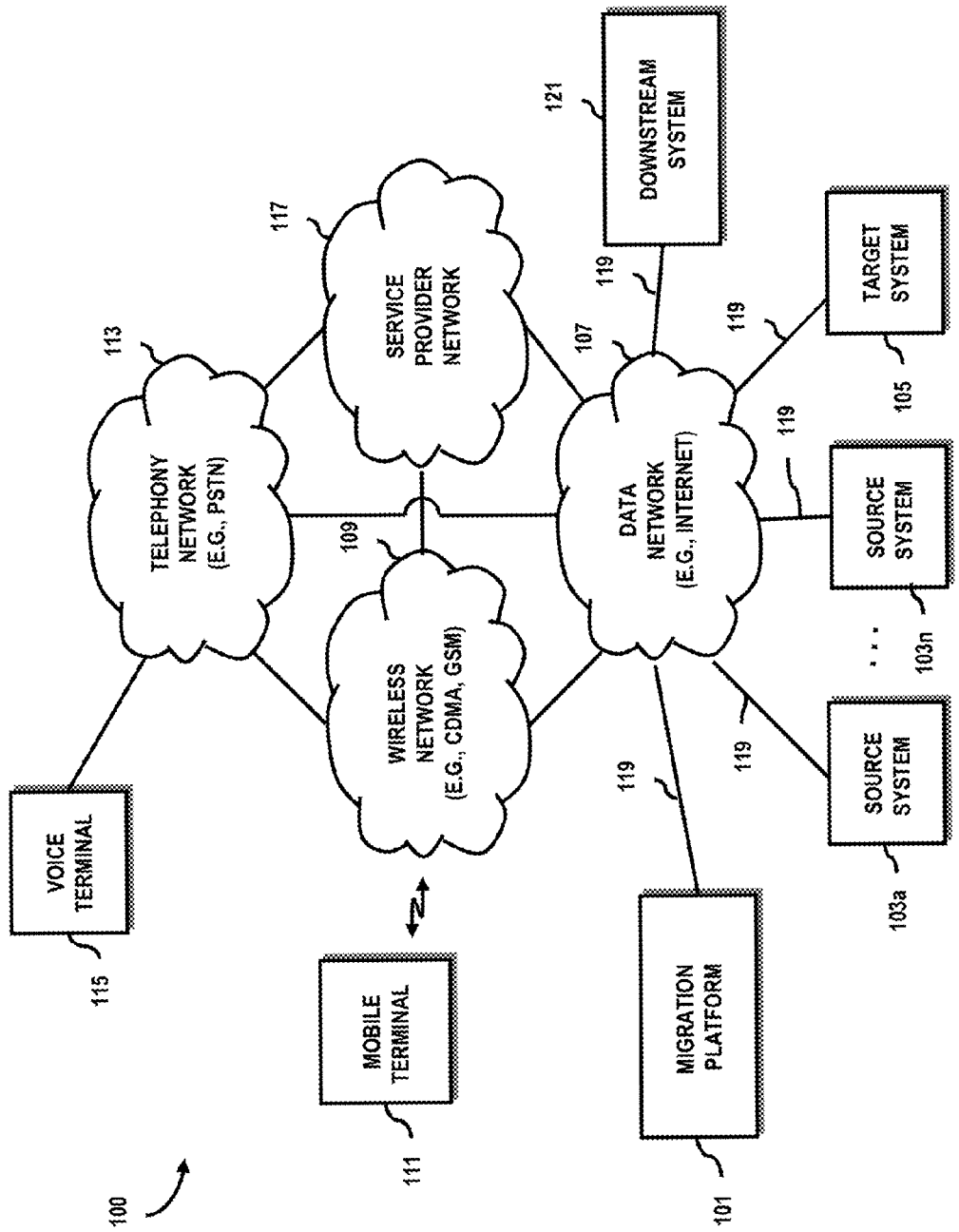
FIG. 1 is a diagram of a system capable of providing migration of data from multiple sources, according to an exemplary embodiment.

FIG. 1 is a diagram of a system capable of providing migration of data from multiple sources, according to an exemplary embodiment. For the purposes of illustration, system 100 is described with respect to a mechanism for specifically migrating telephony data from multiple sources that are associated with a telephony network; however, the illustration may be applied to migrating essentially and type of data from any kind of source.

System 100 includes a migration platform 101 that has connectivity to one or more source systems 103 and a target system 105. As used herein, a "source system" refers to a source for data, which can be presented in a variety of forms. For example, platform 101 receives files containing data from one or more source systems 103 and performs processing of the data for outputting to the target system 105. The source system 103 can be associated with a single entity (organization, business, etc.) or multiple distinct entities. Similarly, the target system 105 can be operated by one or more entities. In some embodiments, the source system 103 and target system 105 utilize database management systems, wherein data can be stored in one or more data containers, each container contains records, and the data within each record is organized into one or more fields. For example, in relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

By way of example, source system 103 may be managed by a telephone service provider; as such, source system 103 can relate to a central office, a tandem office or any other entity that supplies data files to be migrated by platform 101. The target system 105 may similarly be a telephone service provider or any other entity such as a forecasting authority (e.g., National Forecasting and Planning System-NFPS) that requires access to the migrated data. Once data such as telephone numbers and associated information are migrated from each of the source systems 103 by platform 101, they can then supplied to the target system 105 to be used for various purposes, such as estimating telephone number shortages, predicting telephone number usage requirements etc. According to certain embodiments, source system 103 and target system 105 utilize different data formats for data of common interest to both systems 103 and 105. It is noted that incompatibility of data can involve the actual data structure.

Data processing platform (also denoted as migration platform) 101 also conveys the converted or migrated data to a downstream system 121 to ensure that all other systems are in synchronization. The migrating platform 101, source systems 103, target system 105 and downstream system 121 may communicate over a data network 107, such as the Internet or any other type of public or private network. Various secure file transfer protocols may be used to securely convey files to be processed from one or more source systems 103 to migration platform 101 and from migration platform 101 to target system 105 as well as to the downstream system 121 over one or more connections 119. Links 119 may include wired (e.g. coaxial cable, twisted pair, fiber optic cable) and/or wireless connections.

In the example of FIG. 1, system 100 includes various communication networks, such as a data network 107 and wireless network 109; these networks 107 and 109 can support telephony services for a mobile terminal 111 to communicate over a telephony network 113 (e.g., Public Switched Telephone Network (PSTN). In this manner, mobile terminal 111 can place and receive calls from a voice terminal 115. For the purpose of illustration, the wireless network 109 can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth™, ultra-wideband (UWB), the IEEE 802.22 standard, etc.

According to certain embodiments, a service provider network 117 includes the data processing (or migration) platform 101; under this arrangement, the data processing service can be provided as a managed service by a service provider. It should be noted that various other types of networks may also be present within system 100 and are not limited to the described systems. Subscribers are also shown within FIG. 1 in communication with the assortment of networks. It should also be noted that the target system 105 may be associated with one or more of the described networks including wireless network 109 and telephony network 113.

In certain embodiments, processing platform 101 retrieves data from source system 103 over data network 107 for processing in form of files—e.g., raw data files. Various secure file transfer protocols may be used to convey these files from source system 103 to processing platform 101, and from processing platform 101 to target system 105. The connections or links that carry the data files may include both wired (e.g., coaxial cable, twisted pair, fiber optic cable) as well as wireless connections.

Figure 2:
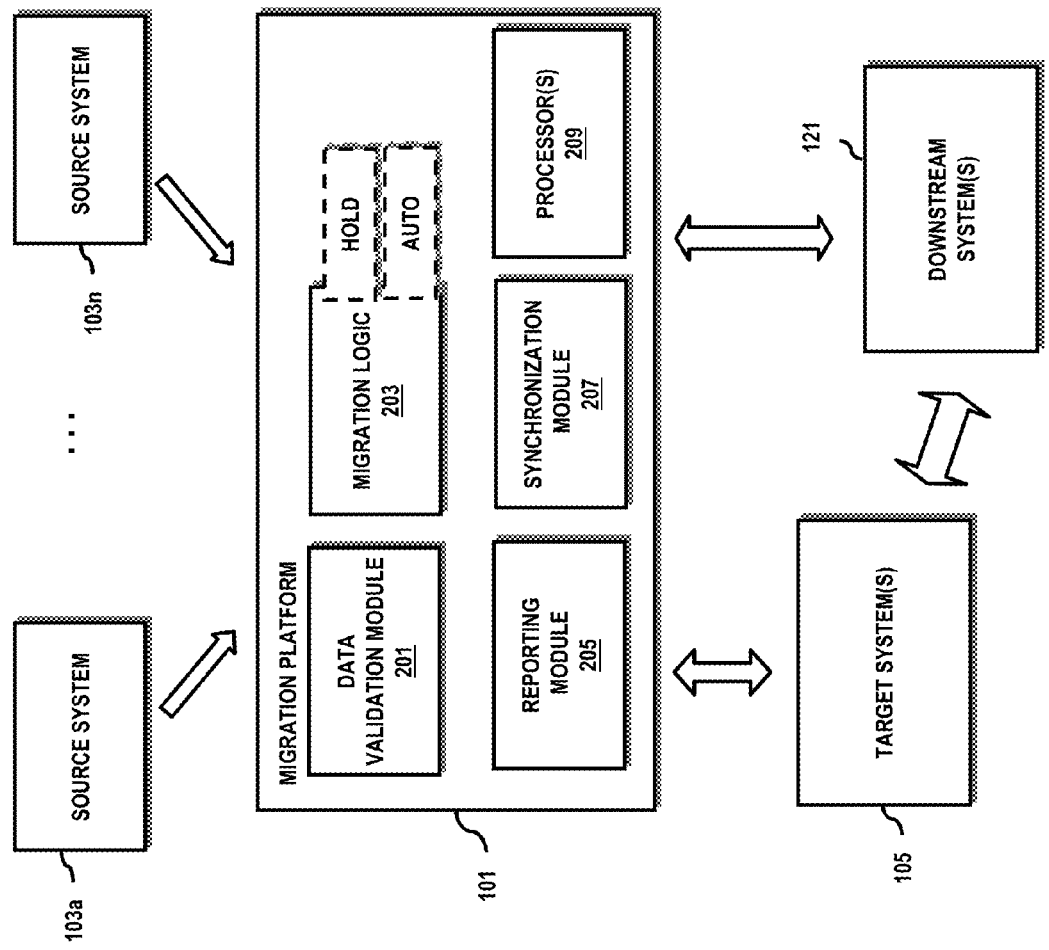
FIG. 2 is a diagram of a migration platform configured to operate in the system of FIG. 1, according to an exemplary embodiment.
Figure 3:
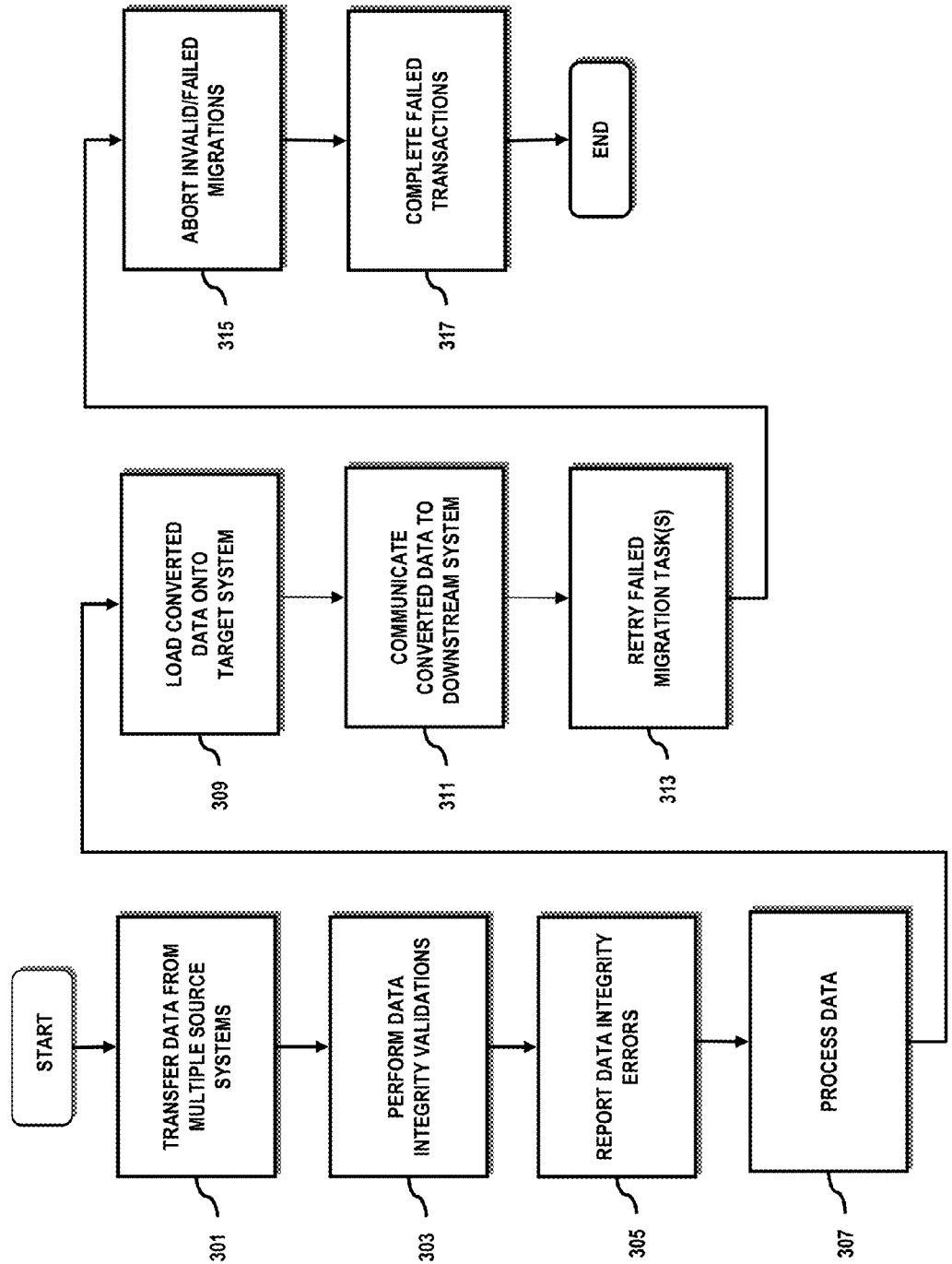
FIG. 3 is a flowchart of a data migration process, according to an exemplary embodiment.

Processing of the data files can executed on processing platform 101, as now explained with respect to FIGS. 2 and 3.

FIG. 2 is a diagram of a migration platform configured to operate in the system of FIG. 1, according to an exemplary embodiment. Platform 101, in certain embodiments, comprises the following components: a data validation module 201, migration logic 203, reporting module 205, and synchronization module 207, which collectively implement the data migration and processing functionality. Data validation module 201, according to one embodiment, checks for the integrity of the data from the source systems 103, for example, by validating the data (e.g., records) against a predetermined data source to determine incomplete or missing information, or formatting or data structure differences. According to one embodiment, migration logic 203 provides the following modes of operation: (1) a HOLD mode, and (2) AUTO mode. In the HOLD mode, the migration is ceased in the event of an error condition stemming from the migration process; by way of example, such HOLD condition may require manual intervention before the process continues. In AUTO mode, the migration logic 203 will abort the entire migration process in case of an error, instead of waiting for analysis by a human agent.

Additionally, reporting module 205 is provided for generating reports (e.g., fall out report) relating to the various sub-processes of the migration procedure. According to one embodiment, synchronization module 207 provides data synchronization between one or more target systems 105 (of which one is shown) and one or more downstream systems 121 (of which one is shown). Although processors 209 are shown to be part of the platform 101, it is contemplated that the processors can reside externally from the platform 209; moreover, these processors can be implemented as multiple servers, work stations, mainframes, or a combination thereof. These modules 201-209 collectively implement the data processing functionality, which is explained with respect to FIG. 3.

FIG. 3 is a flowchart of a data migration process, according to an exemplary embodiment. In step 301, data is retrieved or otherwise transferred from the one or more source systems 103. The process can involve transferring the data from one or more source systems 103 to the migration platform 101; this data transport can be over the data network 107 via communication links 119; such transfer can also be secured using various secure file transfer protocols. As mentioned, such transferred can be provided over a secure communication session. For instance, a secure file transfer protocol, such as Secure Shell (SSH) File Transfer Protocol (also denoted as Secure File Transfer Protocol (SFTP)) can be utilized to effect the transfer. The SSH protocol defines three components: Transport Layer Protocol for server authentication, confidentiality, and integrity; User Authentication Protocol for authenticating user or client; and Connection Protocol for multiplexing encrypted tunnels over logical channels. Further details of the SSH protocol are provided in, for example, the Internet Engineering Task Force (IETF) Request for Comment (RFC) 4251, which is incorporated herein by reference in its entirety. Once the data securely arrives at platform 101, where the data is extracted. Subsequently, an integrity validation is performed in step 303 on the data to identify errors, such as missing telephone numbers, missing data fields, invalid telephone number groups, etc. By validating the data transferred from one or more source systems 103, any missing and/or incorrect pieces of information can be effectively identified.

After completion of the validation process, any errors that arise are consequently reported, as in step 305, by the data reporting module 205. These errors may then be automatically or manually corrected; and any missing/invalid information may be replaced with the correct data.

The reporting phase 305 is followed by the data processing stage 307 where the data is processed according to the needs of the target system 105. The processing may involve any necessary conversion or transformation of the validated data into a form that is acceptable by the target system 105 (and the downstream system 121). The processed (i.e., converted) data is subsequently loaded onto the target system 105 to be used for various purposes, shown as step 309 in FIG. 3.

The newly processed and migrated data may also be communicated to a downstream system 121, as in step 311. The migrated data is supplied to the downstream system 121, in one embodiment, to ensure that synchronization is achieved among all other systems that are a part of the network 107 or system 100. The synchronization module 207 of FIG. 2 is commissioned to ensure this outcome.

The migration process may, on occasion, result in one or more failed migrations, owing to a number of reasons. In recognition of this, the migration platform 101, in certain embodiments, is able to retry a failed migration task(s), as in step 313, to restart from the point of failure in the process. The retry function can be performed at an entity level, transaction level, group level (i.e., a set of transactions may be configured into one group) or at a source system level where the migration logic 203 may be engaged to perform such process. An invalid or failed migration may also be aborted by the migration logic 203, per step 315. In addition, the migration logic 203 may also allow for the forceful completion of failed transactions to move forward with the remaining steps in the migration activity, as in step 317.

As mentioned, migration logic 203 supports operations in a HOLD mode, or an AUTO mode. In the HOLD mode, the migration process is halted for manual intervention, while the AUTO mode of operations aborts the process without waiting for any manual intervention.

Figure 4:
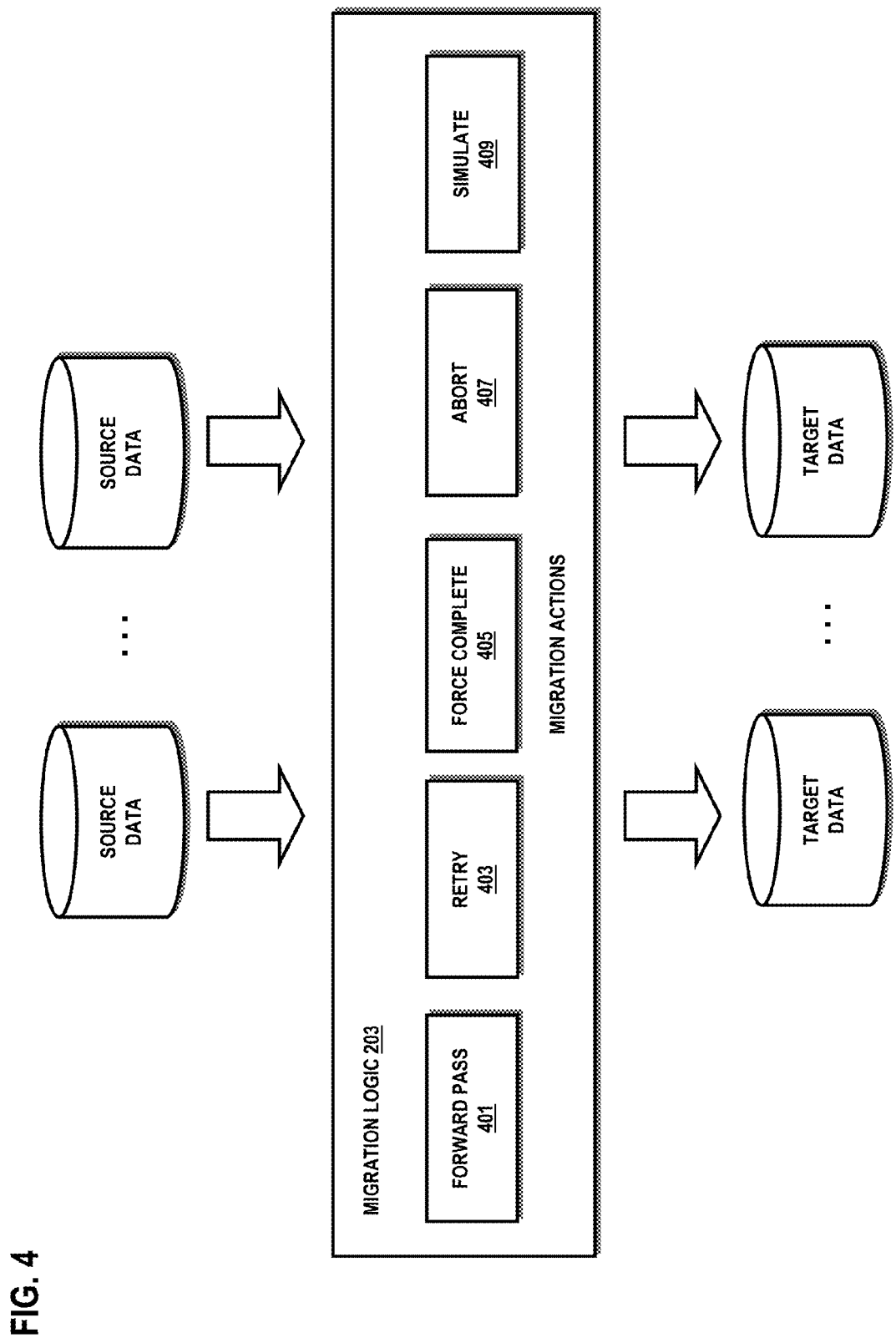
FIG. 4 is a diagram of various migration actions that can be performed by the migration platform of FIG. 2, according to an exemplary embodiment.

FIG. 4 is a diagram of various migration actions that can be performed by the migration platform of FIG. 2, according to an exemplary embodiment. In this example, platform 101, via migration logic 203, provides the following actions or functions: Forward Pass 401, Retry 403, Force Complete 405, Abort 407, and Simulate 409. The forward pass action 401 initiates the migration by validating the entity being migrated, retrieves data from one or more source systems, loads the data into the target system 105 and updates downstream systems 121. The retry action 403, on the other hand, allows for re-executing (or retrying) a failed migration. This retry command, in one embodiment, is enabled to start from the point of the first failure and continues until the migration is completed.

It is recognized that there are certain situations when a retry of migration will fail with high frequency because of a program bug or due to an external factor that may not be controllable. In order to avoid repeated retries resulting in repeated failures, the migration platform 101 can operate using the force completion action 405 to allow the failed migration to be forced into a successful migration mode so that the overall migration activity can progress and not hinder the rest of the migration process.

When the migration platform 101 operates using the abort action 407, each transaction implemented in the forward pass action 401 is basically reverted (or undone), for example, step by step in reverse order.

The simulate action 409 initiates a simulation of the entire migration process, rather than actual performance of the migration process. In this manner, the data is retrieved from the one or more source systems 103 and loaded into the target system 105 without impacting external systems (e.g., downstream system 121).

Figure 5A:
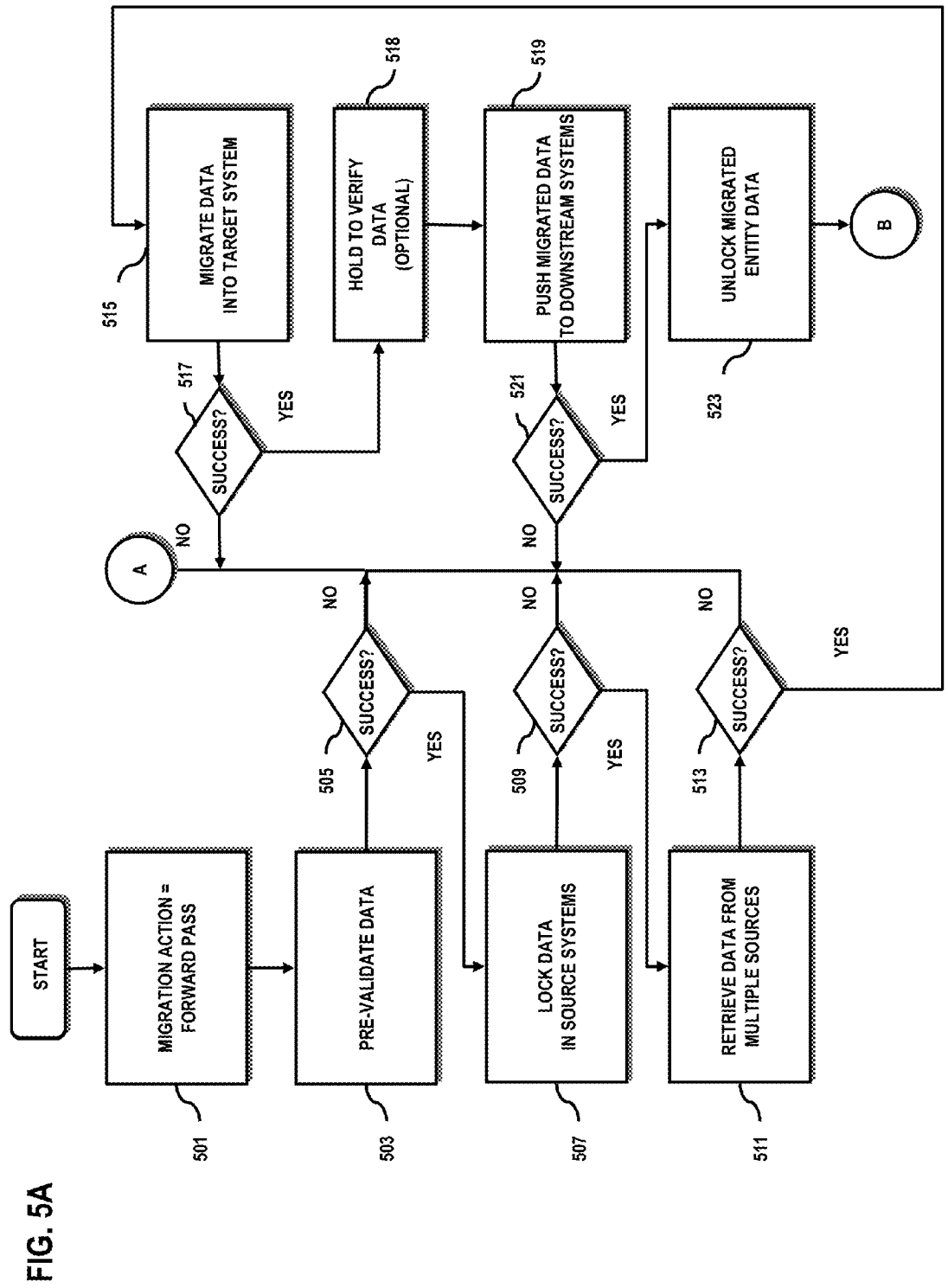
FIGS. 5A and 5B are flowcharts of a process for executing a forward pass action, according to an exemplary embodiment.
Figure 5B:
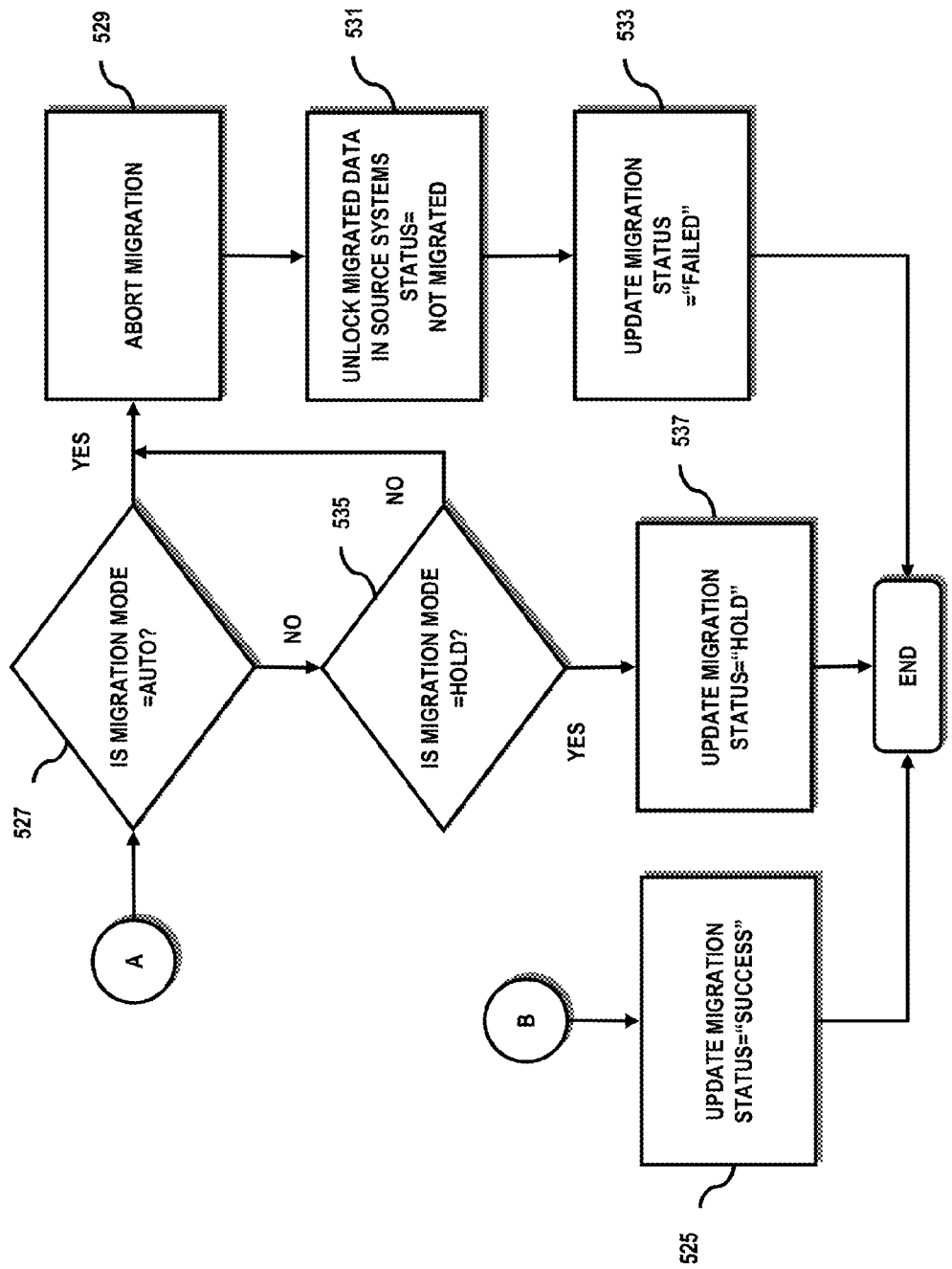

FIGS. 5A and 5B are flowcharts of a process for executing a forward pass action, according to an exemplary embodiment. As mentioned, the migration platform 101 can perform any number of actions pertaining to data migration. The process of FIG. 5A pertains to the forward pass action, accordingly, the migration action is set as forward pass, per step 501. In step 503, the platform 101 pre-validates the master entity data that is being migrated against the source system data. If the pre-validation is successful, as in step 505, then the entity data in the source systems 103 is locked (per step 507). As such, the various related entities within the source systems 103 are informed of the fact that the data is in the process of being migrated. This ensures that the data does not undergo any modification or updates while the migration process is underway. If the outcome of this locking step is indeed successful (step 509), then the data is retrieved from one or more of the source systems 103, as in step 511.

If the result is successful (as determined in step 513), the data is converted and migrated into the target system 105, per step 515. The conversion or transformation may be any standard data processing technique to ensure compatibility with the target system 105. During this step, a number of mappings on the data may also be implemented. The success of the data migration is determined in step 517. Next, the process optionally permits specifying a HOLD state for verification of the data, per step 518. In step 519, upon determining that the data transfer to the target system 105 is successful, the transferred data is pushed to one or possibly more downstream systems 121. If the push is successful, as determined in step 521, the migrated entity data is unlocked within the source systems 103 (step 523). At this point, the migration status of the target system is also set to "MIGRATED," according to one embodiment.

As shown in FIG. 5B, in step 525, the migration status is updated to the status of "SUCCESS" in the target system 105. If it is determined that any one of steps 503, 507, 511, 515 and 519 does not result in a successful outcome, the process, as in step 527, to determines whether the migration mode is set to "AUTO". If that is indeed the case, the platform 101 aborts the entire migration, per step 529. Also, in step 531, the migrated entity data in the source systems 103 is unlocked, and the migration status is set to "NOT MIGRATED". In step 533, the migration status in the target system 105 is set to "FAILED."

If, on the other hand, the migration mode is not set to "AUTO," the process determines, as in step 535, whether the migration mode is set to "HOLD," in which case the migration is essentially suspended for manual intervention and correction, and the migration status in the target system 105 is set, as in step 537, to "HOLD." Otherwise, according to one embodiment, the process assumes the operation is in the AUTO mode, resulting in aborting of the migration process (step 529).

Figure 6:
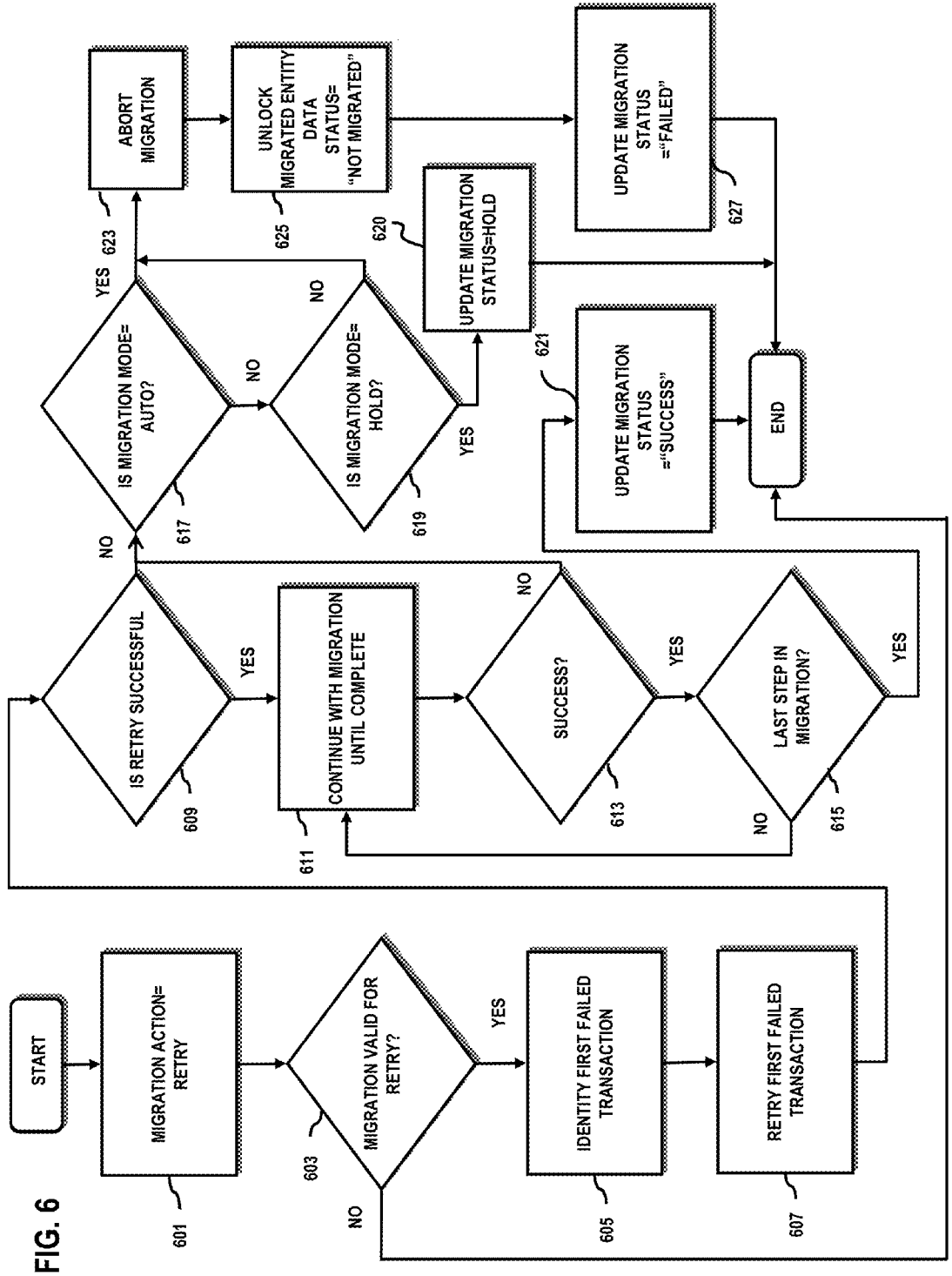
FIG. 6 is a flowchart of a process for executing a retry action, according to an exemplary embodiment.

FIG. 6 is a flowchart of a process for executing a retry action, according to an exemplary embodiment. If it is determined that any one of steps 503, 507, 511, 515 and 519 does not result in a successful outcome, the process, as in step 527, to determines whether the migration mode is set to "AUTO".

If that is indeed the case, the platform 101 aborts the entire migration, per step 529. Also, in step 531, the migrated entity data in the source systems 103 is unlocked, and the migration status is set to "NOT MIGRATED". In step 533, the migration status in the target system 105 is set to "FAILED."

If, on the other hand, the migration mode is not set to "AUTO," the process determines, as in step 535, whether the migration mode is set to "HOLD," in which case the migration is essentially suspended for manual intervention and correction, and the migration status in the target system 105 is set to "HOLD."

As depicted in FIG. 4, another migration action that the platform 101 may operate is RETRY, in which the migration may be implemented again if the initial migration attempt is not successful. In one embodiment, the migration retry starts from the point of the first failure and continues until the migration is complete. In step 601, the migration action of the platform 101 is set to "RETRY." Before proceeding further, the platform 101, in step 603, determines whether the circumstances surrounding the migration are valid or appropriate for executing a retry. If it is determined that the migration is not valid for a retry, then the retry attempt is terminated. If the platform 101 confirms that it is indeed valid, the first failed transaction is identified, per step 605. This failed transaction is then retried, as in step 607.

Next, in step 609, the process determines whether the retry is successful; if so, the process continues (step 611) until the migration is complete. The process, as in step 613, then checks to establish whether the overall migration retry action results in success. If the outcome is indeed successful, the process determines, in step 615, whether it is the last step in the migration procedure. If this is confirmed, then the migration status in the target system is set to "SUCCESS" to update the target system 105 with information that the migration was successful (per step 621). If, otherwise, the process determines, per step 615, that it is not the last step in the migration procedure, the process repeats step 611 until the migration is complete.

If a successful result is not achieved in either step 609 or 613, the process continues, as in step 617, to check whether the migration mode is set to "AUTO". If the migration mode is indeed set to "AUTO", the process aborts the entire migration process (per step 623), and unlocks the migrated entity data in the source systems 103. Furthermore, the migration status within the source systems 103 is set to "NOT MIGRATED" (step 625); and the migration status within the target system is set to "FAILED" (step 627).

Returning to step 617, if the migration mode is not set to "AUTO," the process determines whether the migration mode is set to "HOLD" (step 619); the migration is suspended for manual intervention. If the migration mode is set to HOLD, then the process updates the migration status of the target system 105 to HOLD, as in step 620. If the HOLD operation is not in effect, then the default AUTO operation is assumed, and the process is aborted (per step 623).

Figure 7:
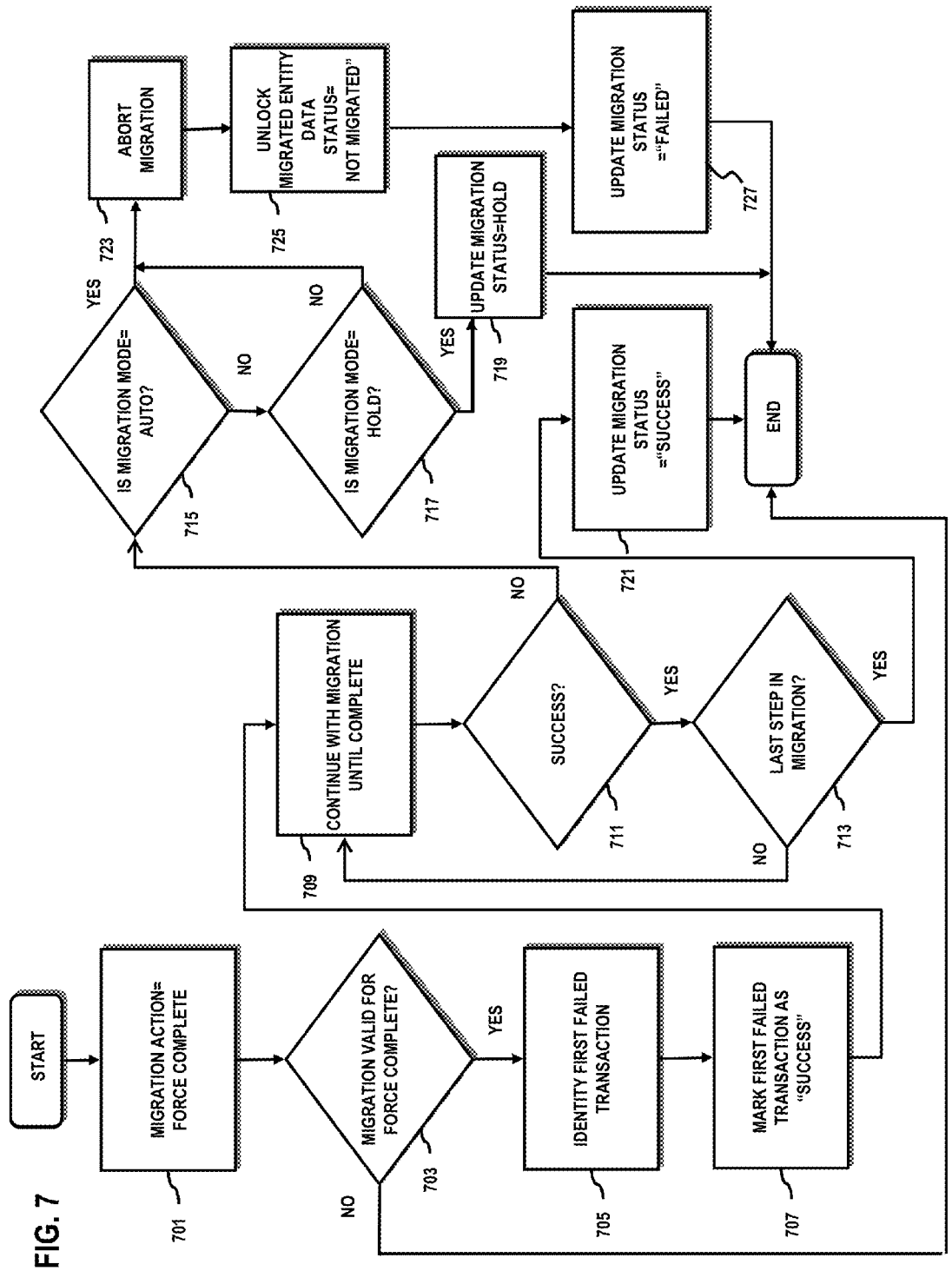
FIG. 7 is a flowchart of a process for executing a force complete action, according to an exemplary embodiment.

FIG. 7 is a flowchart of a process for executing a force complete action, according to an exemplary embodiment. This process illustrates the force complete action associated with the migration process. Accordingly, in step 701, the platform 101 is set to "FORCE COMPLETE." The platform 101, as in step 703, determines whether the action is appropriate. If not, the force complete attempt is terminated. Otherwise, the first failed transaction is identified, as in step 705. This failed transaction is effectively declared completed (even though it is not actually so) through a mark of "SUCCESS," in step 707. The platform 101 consequently continues with the migration, as in step 709, until the migration is complete.

The platform 101 then checks to establish whether the overall migration force complete action results in success (step 711). If successful, the platform 101 determines, per step 713, whether it is the last step in the migration procedure. If this is also confirmed, then the migration status in the target system is set to "SUCCESS" to update the target system 105 with information that the migration was successful, as in step 721.

Otherwise, in step 713, if it is not the last step in the migration, the process repeats step 709 to continues until the migration is complete.

If success is not achieved in step 711, the process, per step 715, checks whether the migration mode is set to "AUTO." If the migration mode is set to "AUTO", the process, per steps 723-727, aborts the entire migration process, unlocks the migrated entity data in the source systems 103, and the migration status within the source systems is set to "NOT MIGRATED," while the migration status within the target system 105 is set to "FAILED." If the alternative is true, i.e., if it is determined in step 717 that the migration mode is set to "HOLD", the migration procedure is suspended for manual intervention; otherwise, the process aborts (as the default operation is AUTO). Also, the migration status in the target system 105 is set to "HOLD" (step 719).

Figure 8:
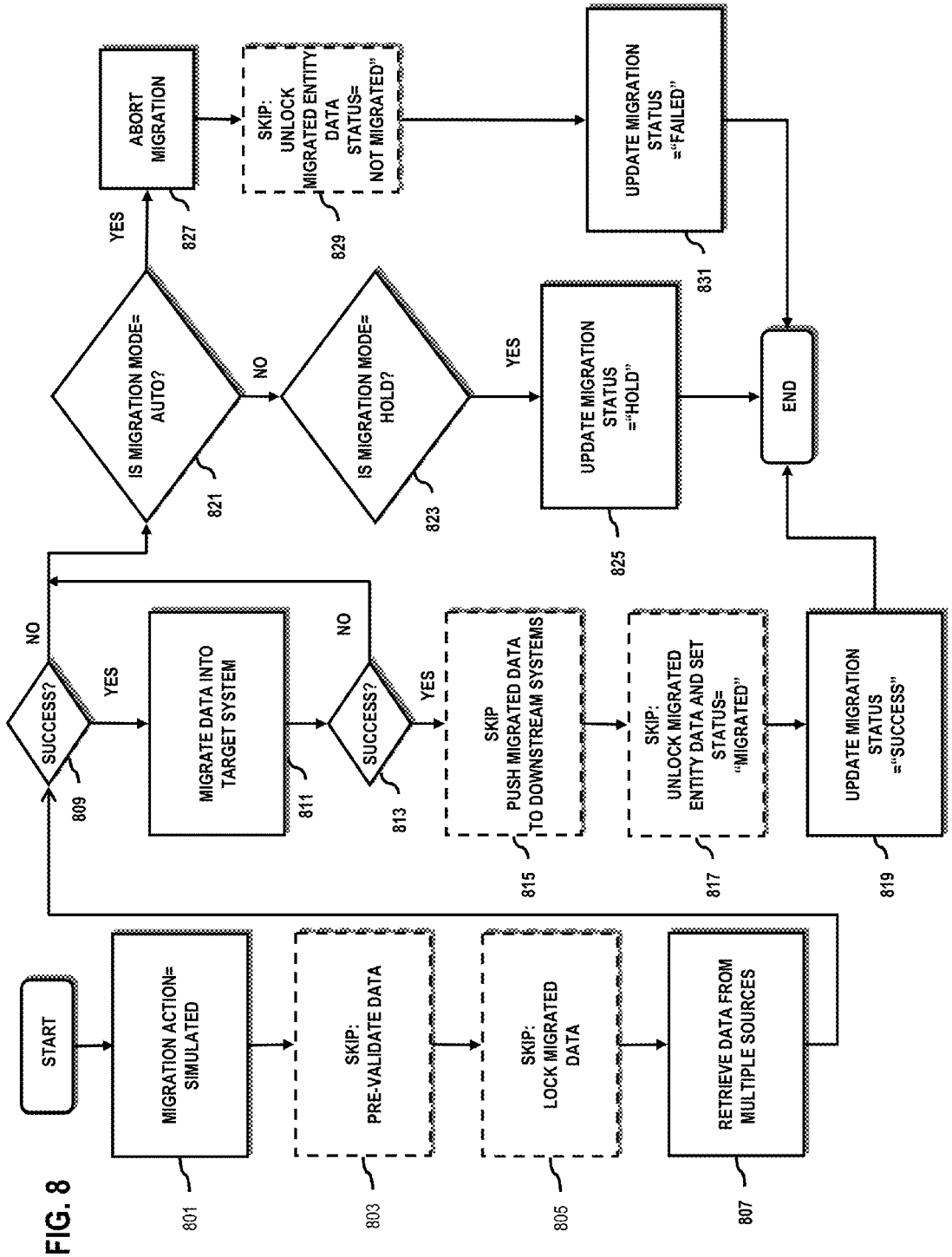
FIG. 8 is a flowchart of a process for executing a simulated action, according to an exemplary embodiment.

FIG. 8 is a flowchart of a process for executing a simulated action, according to an exemplary embodiment. When the platform 101 is configured to operate based on the simulate action, the data is retrieved from the source systems 103 and loaded into the target system 105 without impacting the source systems 103. To initiate the migration simulation, the migration action is set to "SIMULATED," per step 801. Next, the platform 101 can skip the steps of pre-validating the master entity data and locking the migrated data (corresponding to steps 803 and 805). Such steps are not performed (or skipped) because the migration action is simulated rather than actually being performed; hence, these steps are irrelevant for the simulation process. In step 807, data from multiple source systems 103 is retrieved. If it is determined, per step 809, that the data retrieval process is successful, then the retrieved data is migrated into the target system 105, as in step 811. If, in turn, the migration of data that is transferred into the target system 105 is evaluated successfully, as in step 813, the process skips steps 815 and 817 (these steps would typically occur in a non-simulated action mode), and terminates. In step 819, the migration status is then updated to SUCCESS to indicate the completion of the simulated migration.

If the determination in either step 809 or 813 results in an unsuccessful outcome, the platform 101 determines what the migration mode has actually been set to. If the migration mode is set to "HOLD" then the platform 101 holds the migration for manual correction and the migration status within the target system 105 is set to "HOLD" corresponding to steps 823 and 825 respectively. If, in contrast, the mode has been set to "AUTO", the platform 101 proceeds with aborting the entire migration and updating the migration status in the target systems as "FAILED", as in steps 827 and 831. The platform 101 also skips step 829 in the simulated mode.

Figure 9A:
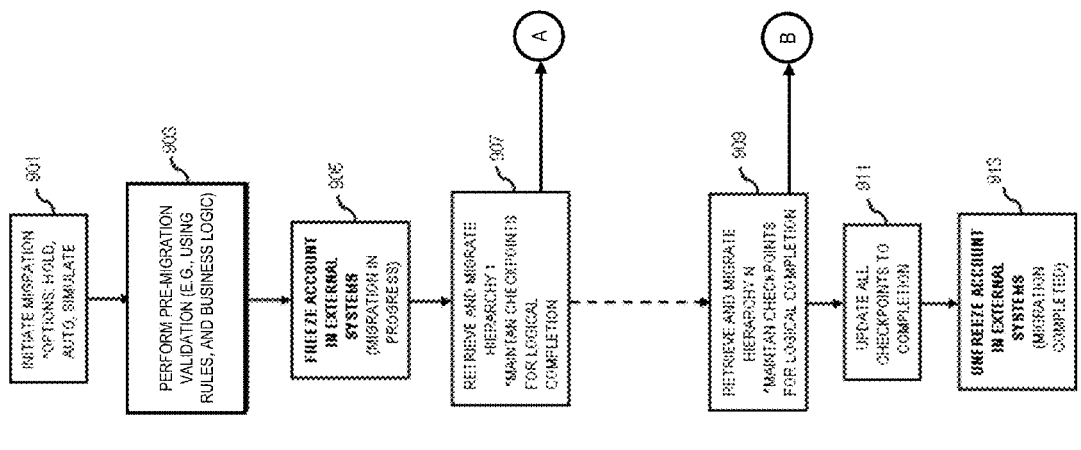
FIGS. 9A and 9B are diagrams of a migration process performed on entities arranged hierarchically, according to an exemplary embodiment.
Figure 9B:
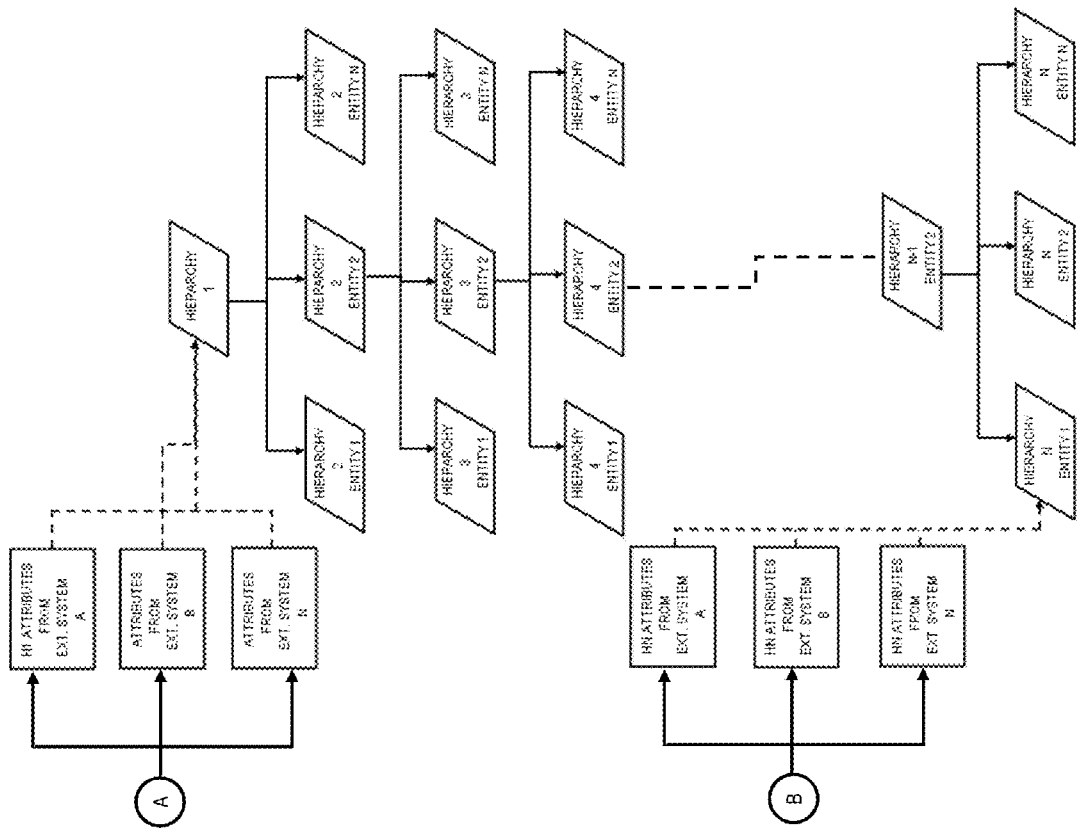

By way of example, the actions of Retry, Abort, and Force Complete can be applied to the migration process involving a structured arrangement of entities, as explained with respect to FIGS. 9A and 9B.

FIGS. 9A and 9B are diagrams of a migration process performed on entities arranged hierarchically, according to an exemplary embodiment. Under this scenario, platform 101 initiates a migration process involving a multitude of external systems (A . . . N), which represent the data sources, for each hierarchical arrangement of entities 1 . . . N. The hierarchies 1 . . . N represent the relationships among the entities, whereby the data migration process can follow a systematic approach.

As shown in FIG. 9A, in step 901, the migration process is initiated; as noted, the options can involve either of the HOLD or AUTO mode and the SIMULATE action. In step 903, pre-migration validation is performed. For example, the process may apply rules that are specific to the particular external system and/or business logic. Next, the process "freezes" (or locks) the accounts of the external systems 103—i.e., halts the data transactions of each of these systems 103 (step 905). Thereafter, in steps 907 and 909, the process retrieves and converts (or migrates) the data from each of the systems 103 according to a predetermined arrangements (e.g., hierarchies 1 . . . N) of the entities. During this process (of steps 907 and 909), checkpoints are maintained to ensure logical completion of the data migration process. In step 911, the process then updates all the checkpoints to completion. In step 913, the accounts can be "un-frozen" in the external systems 103, such that data transactions can resume as the migration procedure is deemed complete.

As seen in FIG. 9B, attributes from each of the external systems 103 are extracted and organized into predetermined arrangements, according to one embodiment. In one embodiment, these arrangements are in form of hierarchies 1 . . . N that are created based on the entities A . . . N. It is contemplated that other relationships can be defined.

The described processes and arrangements, in certain embodiments, provide efficient data migration, while minimizing the use of valuable system and network resources.

The processes described herein for performing data migration may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
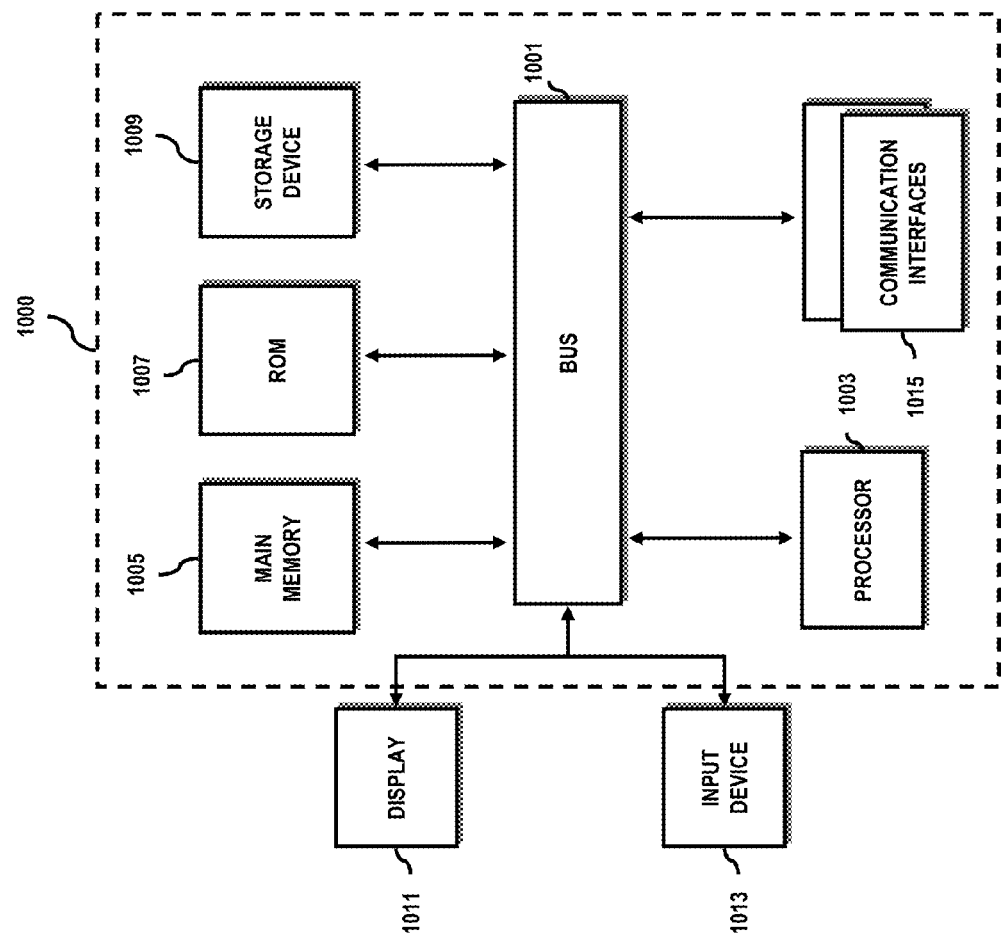
FIG. 10 is a diagram of a computer system that can be used to implement various exemplary embodiments.

FIG. 10 illustrates computing hardware (e.g., computer system) 1000 upon which exemplary embodiments can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multiprocessing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
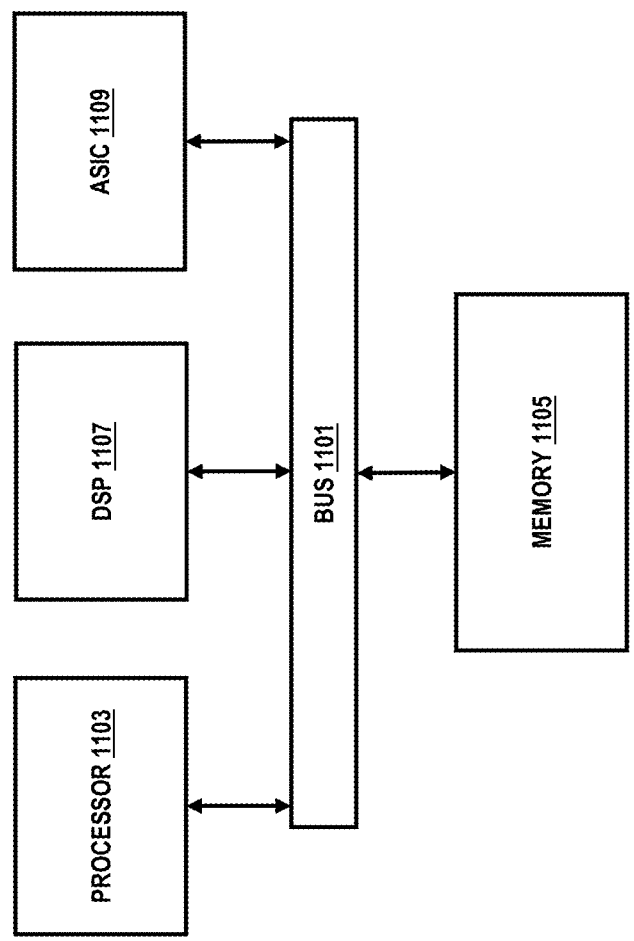
FIG. 11 is a diagram of a chip set that can be used to implement various exemplary embodiments.

FIG. 11 illustrates a chip set 1100 upon which an embodiment of the invention may be implemented. Chip set 1100 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 3 and 5-9.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to migrating data from multiple sources. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving data from a plurality of source systems, each of the plurality of source systems being associated with a respective data format, wherein a data entry of at least one of the plurality of source systems is locked prior to the receiving of data from the plurality of source systems;
processing the received data for conversion to a target system based on the respective data formats;
selectively initiating one or more of a plurality of available actions corresponding to a detected failure condition associated with the processing, wherein the plurality of available actions comprises retrying the processing, aborting the processing, initiating simulation of the processing, and forcing completion of the processing;
initiating loading of the converted data to the target system;
initiating transmission of the converted data to a downstream system after completion of the selected one or more available actions based on whether the loading of the converted data to the target system is successful;
initiating data synchronization between the downstream system and the target system; and
initiating an unlocking of the data entry based on a determination of whether the transmission to the downstream system and/or the data synchronization between the downstream system and the target system is successful.

2. A method according to claim 1, further comprising:
initiating data synchronization between the downstream system and the target system, wherein the processing of the received data is further for conversion to the downstream system.

3. A method according to claim 1, further comprising:
validating integrity of the received data with respect to format and content; and
generating an error report specifying one or more data integrity errors based on the validation of the received data.

4. A method according to claim 1, further comprising:
aborting the processing in response to the detected failure condition by undoing one or more tasks associated with the processing.

5. A method according to claim 1, further comprising:
initiating simulation of the processing of the received data.

6. A method according to claim 1, further comprising:
initiating completion of the processing irrespective of the detected failure condition.

7. A method according to claim 1, wherein the retrying is performed at an entity level, a transaction level, a group level, or a source system level.

8. A method according to claim 1, further comprising:
determining mode of the processing of the received data, where the mode includes a hold mode specifying waiting for a manual intervention upon the detection of the failure condition, and an auto mode that specifies aborting the processing without waiting for the manual intervention.

9. An apparatus comprising:
at least one processor; and
at least one memory including computer program code,
the at least one memory and the computer program code configured to, with the at least one processor, cause the apparatus to perform at least the following,
receive data from a plurality of source systems, each of the plurality of source systems being associated with a respective data format, wherein a data entry of at least one of the plurality of source systems is locked prior to the receiving of data from the plurality of source systems;
process the received data for conversion to a target system based on the respective data formats;
selectively initiate one or more of a plurality of available actions from a point of failure corresponding to a detected failure condition associated with the process, wherein the plurality of available actions comprises retrying the processing, aborting the processing, initiating simulation of the processing, and forcing completion of the processing; initiate loading of the converted data to the target system;
initiate transmission of the converted data to a downstream system after completion of the selected one or more available actions based on whether the loading of the converted data to the target system is successful;
initiate data synchronization between the downstream system and the target system; and
initiate an unlocking of the data entry based on a determination of whether the transmission to the downstream system and/or the data synchronization between the downstream system and the target system is successful.

10. An apparatus according to claim 9, wherein at least one of the respective data formats is incompatible with another one of the respective data formats.

11. An apparatus according to claim 9, wherein the apparatus is further caused to:
validate integrity of the received data with respect to format and content; and
generate an error report specifying one or more data integrity errors based on the validation of the received data.

12. An apparatus according to claim 9, wherein the apparatus is further caused to:
abort the processing in response to the detected failure condition by undoing one or more tasks associated with the processing.

13. An apparatus according to claim 9, wherein the apparatus is further caused to:
initiate simulation of the processing of the received data.

14. An apparatus according to claim 9, wherein the apparatus is further caused to:
initiate completion of the processing irrespective of the detected failure condition.

15. An apparatus according to claim 9, wherein the retrying is performed at an entity level, a transaction level, a group level, or a source system level.

16. An apparatus according to claim 9, wherein the apparatus is further caused to:
determine mode of the processing of the received data, where the mode includes a hold mode specifying waiting for a manual intervention upon the detection of the failure condition, and an auto mode that specifies aborting the processing without waiting for the manual intervention.

17. A system comprising:
a migration platform, comprising one or more processors, configured to:
receive data from a plurality of source systems over one or more communication networks, wherein each of the plurality of source systems is associated with a respective data format, and a data entry of at least one of the plurality of source systems is locked prior to the receiving of data from the plurality of source systems;
process the received data for conversion to a target system based on the respective data formats;
selectively initiate one or more of a plurality of available actions from a point of failure corresponding to a detected failure condition associated with the process, wherein the plurality of available actions comprises retrying the processing, aborting the processing, initiating simulation of the processing, and forcing completion of the processing;
initiate loading of the converted data to the target system;
initiate transmission of the converted data to a downstream system after completion of the selected one or more available actions based on whether the loading of the converted data to the target system is successful;
initiate data synchronization between the downstream system and the target system; and
initiate an unlocking of the data entry based on a determination of whether the transmission to the downstream system and/or the data synchronization between the downstream system and the target system is successful.

18. A system according to claim 17, wherein the platform is further configured to initiate data synchronization between the downstream system and the target system.

19. A system according to claim 17, wherein the platform is further configured to validate integrity of the received data with respect to format and content, and to generate an error report specifying one or more data integrity errors based on the validation of the received data.

20. A system according to claim 17, wherein the platform is further configured to abort the processing in response to the detected failure condition by undoing one or more tasks associated with the processing.

* * * * *